US011820963B2

(12) United States Patent
Fernandez Fernandez et al.

(10) Patent No.: US 11,820,963 B2
(45) Date of Patent: Nov. 21, 2023

(54) PRODUCT FOR OBTAINING CLEANING PRODUCTS FROM VEGETABLE OILS, METHOD FOR OBTAINING THE PRODUCT AND METHOD FOR USING SAME

(71) Applicant: SAMSARAPPS, S.L., Majadahonda (ES)

(72) Inventors: Sergio Alejandro Fernandez Fernandez, Majadahonda (ES); Alberto Balfagon Costa, Majadahonda (ES)

(73) Assignee: SAMSARAPPS, S.L., Majadahonda (ES)

( * ) Notice: Subject to any disclaimer, the term of this patent is extended or adjusted under 35 U.S.C. 154(b) by 0 days.

(21) Appl. No.: 17/913,580

(22) PCT Filed: Dec. 9, 2020

(86) PCT No.: PCT/ES2020/070774
§ 371 (c)(1),
(2) Date: Sep. 22, 2022

(87) PCT Pub. No.: WO2021/191478
PCT Pub. Date: Sep. 30, 2021

(65) Prior Publication Data
US 2023/0140978 A1 May 11, 2023

(30) Foreign Application Priority Data
Mar. 23, 2020 (ES) .............. ES202030237

(51) Int. Cl.
C11D 10/00 (2006.01)
C11D 10/04 (2006.01)
C11D 13/10 (2006.01)
C11D 9/02 (2006.01)
C11D 1/14 (2006.01)

(52) U.S. Cl.
CPC ............ C11D 10/042 (2013.01); C11D 13/10 (2013.01); C11D 1/146 (2013.01); C11D 9/02 (2013.01)

(58) Field of Classification Search
CPC .............................. C11D 10/042; C11D 13/10
See application file for complete search history.

(56) References Cited

U.S. PATENT DOCUMENTS

| 4,806,269 A | 2/1989 | Shimizu | |
| 8,785,366 B2 * | 7/2014 | Mondin | C11D 3/2075 134/6 |

FOREIGN PATENT DOCUMENTS

| CN | 101130719 | | 2/2008 | |
| CN | 109475129 A | * | 3/2019 | ............... A21B 1/48 |
| ES | 184980 A1 | | 1/1949 | |
| ES | 2650446 | | 1/2018 | |
| JP | H06322397 | | 11/1994 | |
| SU | 878779 | | 11/1981 | |
| WO | WO-9321298 A1 | * | 10/1993 | ........... C11D 17/003 |

OTHER PUBLICATIONS

The International Search Report issued in corresponding International Application No. PCT/ES2020/070774; dated Feb. 25, 2021.

* cited by examiner

Primary Examiner — Necholus Ogden, Jr.
(74) Attorney, Agent, or Firm — Pearne & Gordon LLP

(57) ABSTRACT

The product of the invention allows cleaning products to be obtained by substantially increasing the oil-to-soap conversion rate to minimise the amount of product to be used, with minimum energy use and maximum transformation speed, allowing work with large volumes of oil. For this purpose, the product for obtaining cleaning products from vegetable oils comprises the following composition in % by weight: sodium dodecyl sulphate (SDS) between 9 and 11%, anhydrous trisodium phosphate between 4.5 and 6%, sodium stearate between 0.1 and 0.3%, xanthan gum between 0.5 and 0.7%, optionally brightener and/or perfume, and the amount of water needed to reach 100%.

17 Claims, No Drawings

PRODUCT FOR OBTAINING CLEANING PRODUCTS FROM VEGETABLE OILS, METHOD FOR OBTAINING THE PRODUCT AND METHOD FOR USING SAME

CROSS-REFERENCE TO RELATED APPLICATIONS

This is a National Stage application of PCT international application PCT/ES2020/070774, filed on Dec. 9, 2020, which claims the right of priority of Spanish patent application P202030237 filed on 23 Mar. 2020, both of which are incorporated herein by reference in their entirety.

TECHNICAL FIELD

The present invention relates to a product and a method for obtaining the same that have been specially designed to obtain cleaning products such as soaps, floor cleaners, dishwashing liquids, detergents and the like from vegetable oil, preferably used, in order to be able to recycle said product in a valuable and effective manner.

The object of the invention is to provide a means that allows the oil-to-soap conversion rate to be substantially increased so as to minimise the amount of product to be used, with minimum energy use.

Another object of the invention is to maximise the transformation speed carried out in the process.

BACKGROUND ART

For years now, homemade soap has been viewed as a basic idea and as part of the "do it yourself" trend, wherein a by-product such as used vegetable oils can be reused at home as raw material for producing one's own green soap that is personalised and attractive, while also saving a few euros on their purchase. It is also socially-oriented due to the ecological aspect this practice may entail and given that it is a sustainable and organic product. Bearing in mind that the average Spanish family generates an average of 10 litres of used oil every year, and one litre of oil contaminates one thousand litres of water, recycling said oil would stop polluting more than 0.8 m³ of water per month.

It is known that saponification is resolved by using sodium hydroxide, potassium hydroxide or a strong base, with the environmental and health risks (corrosion and release of harmful vapours) that it can have on people.

Substituting soda and potash in saponification with sodium salts of phosphoric acid has also been known for a long time, as in the case of patent ESO184980; however, saponification performance is limited when used with used vegetable oils and the result is not the desired one.

Patent document U.S. Pat. No. 4,806,269A discloses a method for obtaining soap from used cooking oils. Said method can be carried out by a consumer easily and with a high level of safety since strong bases such as sodium hydroxide are not involved, but rather a formulation is used whose components include sodium phosphate in addition to other additives. This patent relates to solid products that are mixed together with water and oil and cooking is required to obtain the soap.

Patent document SU878779B also discloses a method for the saponification of used vegetable oil by treating it with sodium phosphate. In this case, cooking is also necessary to obtain the soap.

Patent document JPH06322397 discloses a composition for manufacturing soap from oil used to fry tempura which uses xanthan gum, among other ingredients, and patent document CN101130719 A discloses a beauty soap whose components include sodium stearate.

In trying to avoid this problem, the very applicant is the holder of the invention patent P201730021 (ES2650446B2), wherein a formulation for the treatment of non-toxic vegetable oils is described, wherein in the method for obtaining the soap it is not necessary to heat the mixture of oil and the saponifying formulation.

In this way, it is clearly easier for the user to obtain soap by avoiding having to heat the mixture and the gases that can be released during cooking, which makes it easier to manage at the domestic level, its use not entailing any risk to people's health.

However, this product has a number of limitations that would be desirable to improve, among which the following should be mentioned:

The proportion of product or formulation to be used in relation to the volume of vegetable oil to be treated is high, which entails associated economic costs, so it would be desirable to increase the conversion rate.

The transformation speed is slow.

It only allows small volumes of vegetable oil to be treated, so that it does not allow volumes of soap greater than two litres to be obtained.

SUMMARY OF THE INVENTION

The method and product for obtaining soap from vegetable oils that is disclosed solves the aforementioned problem in a fully satisfactory manner, substantially increasing the product performance (oil-to-soap conversion rate), allowing large volumes of oil to be treated, and all this in a process where the production time is minimised and it is carried out at room temperature, which entails important advantages at an industrial level due to the reduction of costs and pollution in the transport and use of packaging.

The differences between this formulation and the formulation described in patent ES2650446B2 not only lie in the fact that the formulation has been concentrated, but also in that it further contains anhydrous trisodium phosphate instead of sodium phosphate and a higher percentage of xanthan gum. The inventors have found that these changes in the formulation have a tremendous effect on the cleaning power performance of the soap, the product of the present invention being capable of transforming used oil into a soap that is comparable in efficiency to those obtained with sodium hydroxide. As illustrated in the examples, the cleaning power of the formulations of the present invention is much greater than that which would be obtained with the formulation of the example of patent ES2650446B2.

The product and method object of the invention is applicable indistinctly to both small and large volumes of oil to be treated.

Therefore, a first aspect of the present invention relates to a product for obtaining cleaning products from vegetable oils, characterised in that it comprises the following composition in % by weight:

Sodium dodecyl sulphate (SDS) . . . between 9 and 11%;
Anhydrous trisodium phosphate between . . . 4.5 and 6%;
Sodium stearate . . . between 0.1 and 0.3%;
Xanthan gum . . . between 0.5 and 0.7%;
Optionally brightener and/or perfume; and
The amount of water needed to reach 100%.

It is important to point out that this formulation is applicable when obtaining different types of cleaning products, such as soaps, floor cleaners, dishwashing liquids, detergents and the like, wherein brightener and/or perfumes can be added to this formulation depending on the specific intended application, and these components can be added both to the previous product or, in the event that it does not have a brightener and/or perfume, these components can be added when preparing the cleaning product from the product not containing perfume and/or brightener.

Another aspect of the present invention relates to a method for obtaining a cleaning product from vegetable oils as defined above, characterised in that it comprises the following operational steps:
a) Heat the water to a temperature comprised between 40-60° C.;
b) Add the xanthan gum at said temperature and with stirring until it is dissolved;
c) Cut off the heat supply;
d) Add the sodium stearate with stirring;
e) Add the trisodium phosphate with stirring;
f) Add the SDS with stirring;
g) Optionally add brightener and/or perfume;
h) Allow to cool to room temperature; and
i) Add the volume of water evaporated in the process.

From this formulation it is possible to substantially increase the conversion ratio, in an oil/formulation ratio of 90/127=0.71, this value being the maximum conversion limit of the formula, although it presents high efficiency for all the proportions that are below this value.

Lastly, another aspect of the present invention relates to a method for obtaining cleaning products from vegetable oils, characterised in that it comprises the following operational steps:
a) The product for obtaining cleaning products as defined above is poured at room temperature into a reactor, in a proportion by weight of the order of 90/127 (oil/product);
b) The corresponding proportion of oil is poured under intense stirring; and
c) It is left under intense stirring for the minimum time necessary to form the cleaning product.

DETAILED DESCRIPTION OF THE INVENTION

As described above, the product for obtaining cleaning products from vegetable oils comprises the following composition in % by weight:
Sodium dodecyl sulphate (SDS) . . . between 9 and 11%;
Anhydrous trisodium phosphate between 4.5 and 6%;
Sodium stearate . . . between 0.1 and 0.3%;
Xanthan gum . . . between 0.5 and 0.7%;
Optionally brightener and/or perfume in a total amount between 4 and 5%; and
the amount of water needed to reach 100%.

In a particular embodiment, the product for obtaining cleaning products from vegetable oils is one in which the content of anhydrous trisodium phosphate is between 4.5 and 5.5% by weight. In another particular embodiment, the product for obtaining cleaning products from vegetable oils is one in which the content of anhydrous trisodium phosphate is between 5.0 and 5.5% by weight.

In another particular embodiment, the product for obtaining cleaning products from vegetable oils is one in which the content of xanthan gum is between 0.5 and 0.7% by weight. In another particular embodiment, the product for obtaining cleaning products from vegetable oils is one in which the content of xanthan gum is between 0.58 and 0.68% by weight. In another particular embodiment, the product for obtaining cleaning products from vegetable oils is one in which the content of xanthan gum is between 0.65 and 0.68% by weight.

In another particular embodiment, the product for obtaining cleaning products from vegetable oils does not contain brightener and/or perfume, and the content of water is between 83 and 85%, provided that the sum of all components of the formulation is 100%.

In another particular embodiment, the product for obtaining cleaning products from vegetable oils contains brightener and/or perfume and the content of water is between 77 and 84%, provided that the sum of all components of the formulation is 100%.

In another particular embodiment, the product for obtaining cleaning products from vegetable oils has the following composition in % by weight:
Water . . . between 83 and 85%;
Sodium dodecyl sulphate (SDS) . . . between 9 and 11%;
Anhydrous trisodium phosphate . . . between 4.5 and 5.5%;
Sodium stearate . . . between 0.15 and 0.17%;
Xanthan gum . . . between 0.58 and 0.68%; provided that the sum of all the components of the formulation equals 100%.

In another particular embodiment, the product for obtaining cleaning products from vegetable oils is one that contains perfume in a percentage by weight of less than 5%. In a particular embodiment, the percentage by weight of perfume is between 3.0 and 4.7%.

In another particular embodiment, the product for obtaining cleaning products from vegetable oils is one that contains brightener in a percentage by weight of less than 3%.

In a particular embodiment, the percentage by weight of brightener is between 1.5 and 2.5%.

In another particular embodiment, the product for obtaining cleaning products from vegetable oils is one that is characterised in that, depending on the type of cleaning product to be obtained, the cleaning product can have brightener and/or perfumes added thereto, in a proportion by weight comprised between 4 and 5%.

As mentioned earlier, the method for obtaining a product for obtaining a product for obtaining cleaning products from vegetable oils as defined above is part of the present invention, characterised in that it comprises the following operational steps: a) Heat the water to a temperature comprised between 40-60° C.; b) Add the xanthan gum at said temperature and with stirring until it is dissolved; c) Cut off the heat supply; d) Add the sodium stearate with stirring; e) Add the trisodium phosphate with stirring; f) Add the SDS with stirring; g) Optionally add brightener and/or perfume; h) Allow to cool to room temperature; and i) Add the volume of water evaporated in the process.

To carry out step h), the product of step g) can be weighed and the volume of water evaporated in the process can be added. The product is then stored.

In a particular embodiment, the method for obtaining the product for obtaining cleaning products from vegetable oils defined above is the one that consists of the steps indicated above.

In a particular embodiment, the method for obtaining the product for obtaining cleaning products from vegetable oils defined above is carried out without adding aroma and/or perfume.

In another particular embodiment, the method for obtaining the product for obtaining cleaning products from vegetable oils defined above is carried out by adding aroma and/or perfume.

In another particular embodiment, the method for obtaining the product for obtaining cleaning products from vegetable oils defined above is carried out at 50° C.

Therefore, in a particular embodiment, to obtain the product for obtaining cleaning products from vegetable oils, the water is heated to 50° C., and the xanthan gum is added with stirring until it is dissolved, moment when the heat supply is cut off, the sodium stearate is added with stirring, the trisodium phosphate is added with stirring, the SDS is added with stirring and it is allowed to cool to room temperature. The final product is then weighed and the volume of water evaporated in the process is added, to then proceed to store the product.

In another particular embodiment, to obtain the product for obtaining cleaning products from vegetable oils, the water is heated to 50° C., and the xanthan gum is added with stirring until it is dissolved, moment when the heat supply is cut off, the sodium stearate is added with stirring, the trisodium phosphate is added with stirring, the SDS is added with stirring, the aroma and/or the brightener are added with stirring, and it is allowed to cool to room temperature. The final product is then weighed and the volume of water evaporated in the process is added, to then proceed to store the product.

Said product or formulation is mixed with the vegetable oil to be recycled in the proportions described above, being subjected to a stirring process, which speeds up the conversion process without the need for heat input, obtaining a concentrated soap, to which the user can add water to his or her liking, depending on the specific needs of each case.

Therefore, the method for obtaining cleaning products from vegetable oils is part of the present invention, characterised in that it comprises the following operational steps: a) The product for obtaining cleaning products defined above is poured at room temperature into a reactor, in a proportion by weight of the order of 90/127 (oil/product); b) The corresponding proportion of oil is poured under intense stirring; and c) It is left under intense stirring for the minimum time necessary to form the cleaning product.

In a particular embodiment, the method for obtaining cleaning products from vegetable oils defined above is the one that consists of the steps indicated above.

In another particular embodiment, the method for obtaining cleaning products from vegetable oils is characterised in that the product not containing brightener or perfume is used, and depending on the type of cleaning product that is intended to be obtained, after step c), brightener is added with stirring and/or perfume is added with stirring.

The use of anhydrous trisodium phosphate increases the efficiency of the process of transforming oil into soap, the volume of water used in the formulation being reduced, which makes it easier to treat larger volumes of oil, together with the envisaged stirring process, which increases the reaction rate, although, as mentioned above, once the cleaning product is obtained, said product must be diluted with water.

In a particular embodiment, the method for obtaining cleaning products from vegetable oils is one in which the time of step c) is between 0.5' and 30', preferably 10'.

The process thus described would have a reaction time of the order of 20 to 30 seconds when working with conventional volumes of oil, a time that would not be substantially increased in case of working with large volumes. Nevertheless, the new formulation allows for automatic stirring with a propeller stirrer in a turbulent flow that would cause the transformation to take place in a few seconds, almost instantaneously.

The described formulation is more sustainable, substituting the aroma for one that is non-allergenic and also having a neutraliser that leaves the final soap without any aroma, which allows the customer to provide the distinctive scent they want.

The formulation may contain other components such as an anti-odour compound, generally in an amount of between 3 and 10% by weight. This compound can be added to the concentrated product used to obtain the soap or, alternatively, it can be added during preparation of the soap, in particular, before mixing the concentrated formulation with the oil; or alternatively it can be added once the soap has been prepared.

Throughout the description and the claims, the word "comprises" and its variants do not intend to exclude other technical features, additives, components or steps. Moreover, the word "comprises" includes the case of "consists of". For those skilled in the art, other objects, advantages and features of the invention may be partially deduced from both the description and the embodiment of the invention. The following examples are provided by way of illustration and are not intended to limit the present invention. Moreover, the present invention covers all possible combinations of particular and preferred embodiments indicated herein.

EXAMPLES

Different formulations and methods for manufacturing the formulation and obtaining soap are disclosed below. The percentages of the components are by weight relative to the total weight of the composition.

Comparative Example 1: Preparation of 200 Litres of Soap from a More Diluted Product than the Present Invention It is based on the following components:
Water (85.3%) 117.7 kg (liquid)
SDS (6.4%) 8.8 kg (solid)
Trisodium phosphate (3.2%) 4.4 kg (solid)
Sodium stearate (0.1%) 0.14 kg (solid)
Xanthan Gum (0.4%) 0.55 kg (solid)
The following components are added during preparation of the soap
Perfume (3%) 4.2 kg (liquid)
Brightener (1.6%) 2.21 kg (liquid)
Oil 62 litres (liquid).
Method for Preparing the Product.
1—The water is heated to 50° C.;
2—The water is kept hot at 50° C. and the xanthan gum is added with stirring until it is dissolved;
3—Heating is stopped and the rest of the components are added;
4—The sodium stearate is added with stirring;
5—The trisodium phosphate is added with stirring;
6—The SDS is added with stirring;
7—It is allowed to cool to room temperature;
8—The final product is weighed and the evaporated water is added until reaching 131.59 final kilos;
9—The product is stored.
Method for Obtaining the Soap.
1—At room temperature, the 131.59 kilos of prepared product are poured into the reactor;
2—The 62 litres of oil are poured under intense stirring;
3—It is left under intense stirring for 10 minutes;

4—The brightener is added with stirring;
5—The perfume is added with stirring;
6—The product is stored.
Oil/formulation ratio: 62/138=0.45

Example 2: Preparation of a Product for Obtaining a Cleaning Product (200 Litres of Soap) According to the Invention It is based on the following components:
Water (83%) 67.7 kg (liquid)
SDS (10.8%) 8.8 kg (solid)
Trisodium phosphate (5.4%) 4.4 kg (solid)
Sodium stearate (0.17%) 0.14 kg (solid)
Xanthan Gum (0.67%) 0.55 kg (solid)
Total concentrated product: 81.59 Kg
The following ingredients are added during preparation of the soap:
Perfume (3%) 4.2 kg (liquid)
Brightener (1.6%) 2.21 kg (liquid)
Oil 62 litres (liquid).
Method for Preparing the Concentrated Product (81.59 Kilos)
1—The water is heated to 50° C.;
2—The water is kept hot at 50° C. and the xanthan gum is added with stirring until it is dissolved;
3—Heating is stopped and the rest of the components are added;
4—The sodium stearate is added with stirring;
5—The trisodium phosphate is added with stirring;
6—The SDS is added with stirring;
7—It is allowed to cool to room temperature;
8—The final product is weighed and the evaporated water is added until reaching 81.59 final kilos;
9—The product is stored.
Method for Obtaining the Soap:
1—At room temperature, the 81.59 kilos of concentrated product are poured into the reactor;
2—The 62 litres of oil are poured under intense stirring;
3—It is left under intense stirring for 10 minutes;
4—The brightener is added with stirring;
5—The perfume is added with stirring;
6—The product is stored;
Oil/formulation ratio: 62/88=0.71
Once the concentrated soap (150 litres) has been obtained and prior to use, water must be added for the correct functioning of the soap. The amount of water to add is 1 litre of water for every 3 litres of concentrated soap (in the case of having 150 litres of concentrated soap, 50 litres of water would have to be added, giving a total of 200 litres of soap).

Example 3: Preparation of a Product for Obtaining a Cleaning Product According to the Invention It is based on the following components:
Water (84.2%): 36.88 g (liquid)
SDS (10%): 4.38 g (solid)
Trisodium phosphate (5.0%) 2.19 g (solid)
Sodium stearate (0.2%) 0.09 g (solid)
Xanthan Gum (0.6%) 0.26 g (solid)
Total concentrated product: 43.8 g
The product is prepared in the same way as described in example 2.

Method for Preparing Soap:
1—The necessary amount of concentrated product is poured into the reactor;
2—Intense stirring is applied;
3—The oil is poured into the reactor and is kept under stirring for 5 minutes and at room temperature. The concentrated soap is obtained;
4—The amount of water needed to obtain the final soap is then added, while maintaining stirring;
5—The product is left to rest and it is packaged.
The oil/concentrated product ratio is 0.71.
25.1 g of water is added to the obtained soap prior to use. The ratio of added water to concentrated soap obtained is as follows: added water/concentrated soap: 0.335.

Example 4: Preparation of Soap from a Concentrated Product for Obtaining a Cleaning Product According to the Invention It is based on the following components:
Water (77%): 36.88 g (liquid)
SDS (10%): 4.38 g (solid)
Anhydrous trisodium phosphate (5.0%) 2.19 g (solid)
Sodium stearate (0.2%) 0.09 g (solid)
Xanthan Gum (0.6%) 0.26 g (solid)
Total concentrated product: 43.8 g
The following ingredients are added during preparation of the soap:
Perfume (4.7%)
Brightener (2.5%)
Oil: 31.1 g
The product for preparing the soap and the soap are prepared in the same way as described in example 3.

Example 5: Preparation of a Concentrated Product for Obtaining a Cleaning Product According to the Invention that Comprises Brightener It is based on the following components and percentage:
Water (81.7%)
SDS (10%)
Anhydrous trisodium phosphate (5.0%)
Sodium stearate (0.2%)
Xanthan gum (0.6%)
Commercial brightener (2.5%)

Example 6: Preparation of a Concentrated Product for Obtaining a Cleaning Product According to the Invention Comprising Aroma It is based on the following components and percentage:
Water (79.5%)
SDS (10%)
Anhydrous trisodium phosphate (5.0%)
Sodium stearate (0.2%)
Xanthan gum (0.6%)
Aroma (4.7%)

Example 7: Comparison of Cleaning Power Between Different Formulations According to the Invention and Comparative Formulations The product for preparing the soap and the soap are prepared in the same way as described in example 3. It is based on the following components and percentage:

Example 7a with 0.67% Xanthan Gum

Water (83%)
SDS (10.80%)
Anhydrous trisodium phosphate (5.40%)
Sodium stearate (0.17%)
Xanthan gum (0.67%)

Example 7b with 0.57% Xanthan Gum

Water (83.10%)
SDS (10.80%)
Anhydrous trisodium phosphate (5.40%)
Sodium stearate (0.17%)
Xanthan gum (0.57%)

Example 7c with 0.47% Xanthan Gum

Water (83.20%)
SDS (10.80%)
Anhydrous trisodium phosphate (5.40%)
Sodium stearate (0.17%)
Xanthan gum (0.47%)
Comparative example 7d (idem example 7c but with monosodium phosphate)
Water (83.20%)
SSDS (10.80%)
Monosodium phosphate (5.40%)
Sodium stearate (0.17%)
Xanthan gum (0.47%)

Example 7d (concentrated formulation) corresponds to the formulation of patent ES2650446B2, but wherein the amount of water has been reduced, such that the rest of the components have been concentrated. Given that once the soap is formed it must be diluted with water prior to use, after dilution the soap with which the cleaning power has been evaluated would have the same dilution conditions as that described in the example of patent ES2650446B2, specifically, the percentage of xanthan gum would be 0.2%.

The performance is calculated from the cleaning power of the soap (volume of oil capable of dissolving). Therefore, the performance is determined by studying how much oil can be dissolved by the obtained soap. It is based on 100% performance (cleaning power) with the soaps obtained with soda, which are the ones that dissolve the greatest amount of oil (reference soap). For example, 98% performance means that it dissolves 98% of the oil that the soap obtained from soda would dissolve.

Cleaning power of the soap obtained with soda (reference): 100%
Cleaning power performance of the soap obtained with the formulation of comparative example 7d: 47.5%
Cleaning power performance of the soap obtained with the formulation of example 7c: 91.5%
Cleaning power performance of the soap obtained with the formulation of example 7b: 93.2%
Cleaning power performance of the soap obtained with the formulation of example 7c: 98.3%

The results indicate that performance goes from 47.5% with the formulation of comparative example 7d (which corresponds to the example of patent ES 2650446B2) to greater than 90%, even reaching 98.3% with the formulation of the present invention, thanks to the effect of the change in phosphate and the different percentage of xanthan gum.

The effect of changing monosodium phosphate to anhydrous trisodium phosphate is illustrated by comparing comparative example 7d (monosodium phosphate) to example 7c of the invention (anhydrous trisodium phosphate). The saponification performance goes from 47.5% to 91.5%.

The effect of the percentage of xanthan gum is illustrated by the examples of the invention. With the amounts claimed, the saponification performance is greater than 93%, even reaching 98.30% when the amount of xanthan gum is 0.67%.

Likewise, the stability also increases in the formulations with the percentage of xanthan gum in the formulations of the present invention. Therefore, the stability of the formulation of comparative example 7d lasts for days, whereas it lasts for months for the soap prepared with the formulation of example 7a.

CITATION LIST

Patent Literature

ES0184980,
U.S. Pat. No. 4,806,269A
SU878779B
JPH06322397
CN101130719
P201730021

What is claimed is:

1. A product for obtaining cleaning products from vegetable oils,
   wherein the product comprises the following composition in % by weight:
      Sodium dodecyl sulphate (SDS) . . . between 9 and 11%;
      Anhydrous trisodium phosphate . . . between 4.5 and 6%;
      Sodium stearate . . . between 0.1 and 0.3%;
      Xanthan gum . . . between 0.48 and 0.7%;
      Optionally brightener and/or perfume, and
      The amount of water needed to reach 100%.

2. The product for obtaining cleaning products from vegetable oils according to claim 1, wherein the content of anhydrous trisodium phosphate is between 4.5 and 5.5% by weight.

3. The product for obtaining cleaning products from vegetable oils according to claim 1, wherein the content of xanthan gum is between 0.58 and 0.68% by weight.

4. The product for obtaining cleaning products from vegetable oils according to claim 1, wherein when the formulation does not contain brightener and/or perfume, the content of water is between 83 and 85%, and when the formulation contains brightener and/or perfume, the content of water is between 77 and 84%, and provided that the sum of all the components of the formulation is 100%.

5. The product for obtaining cleaning products from vegetable oils according to claim 4, which has the following composition in % by weight:
      Water . . . between 83 and 85%;
      Sodium dodecyl sulphate (SDS) . . . between 9 and 11%;
      Anhydrous trisodium phosphate . . . between 4.5 and 5.5%;
      Sodium stearate . . . between 0.15 and 0.17%;
      Xanthan gum . . . between 0.58 and 0.68%;
   provided that the sum of all the components of the formulation equals 100%.

6. The product for obtaining cleaning products from vegetable oils according to claim 4, which contains perfume in a percentage by weight of less than 5%.

7. The product for obtaining cleaning products from vegetable oils according to claim 4, which contains brightener in a percentage by weight of less than 3%.

8. The product for obtaining cleaning products from vegetable oils according to claim 4, comprising brightener and/or perfumes in a proportion by weight comprised between 4 and 5%.

9. A method for obtaining a product for obtaining cleaning products from vegetable oils as defined in claim 1, comprising the following operational steps:
   a) Heat the water to a temperature comprised between 40-60° C.,
   b) Add the xanthan gum at said temperature and with stirring until it is dissolved;
   c) Cut off the heat supply;
   d) Add the sodium stearate with stirring;
   e) Add the trisodium phosphate with stirring;
   f) Add the SDS with stirring;
   g) Optionally add brightener and/or perfume;
   h) Allow to cool to room temperature; and
   i) Add the volume of water evaporated in the process.

10. The method for obtaining a product for obtaining cleaning products from vegetable oils as defined in claim 9, wherein the product for obtaining the cleaning product does not comprise aroma and/or perfume.

11. The method for obtaining a product for obtaining cleaning products from vegetable oils as defined in claim 9, wherein the product for obtaining the cleaning product comprises aroma and/or perfume.

12. The method for obtaining a product for obtaining cleaning products from vegetable oils as defined in claim 10, which is carried out at 50° C.

13. A method for obtaining cleaning products from vegetable oils, comprising the following operational steps:
   a) The product of claim 1 is poured at room temperature into a reactor, in a proportion by weight of the order of 90/127 (oil/product);
   b) The corresponding proportion of oil is poured under intense stirring; and
   c) It is left under intense stirring for the minimum time necessary to form the cleaning product.

14. The method for obtaining cleaning products from vegetable oils according to claim 13, wherein the time of step c) is 10 minutes.

15. The method for obtaining cleaning products from vegetable oils according to claim 13, wherein the product not containing brightener or perfume is used, and depending on the cleaning product to be obtained, after step c), brightener is added with stirring and/or perfume is added with stirring.

16. The product for obtaining cleaning products from vegetable oils according to claim 2, wherein the content of xanthan gum is between 0.58 and 0.68% by weight.

17. The product for obtaining cleaning products from vegetable oils according to claim 16, wherein when the formulation does not contain brightener and/or perfume, the content of water is between 83 and 85%, and when the formulation contains brightener and/or perfume, the content of water is between 77 and 84%, and provided that the sum of all the components of the formulation is 100%.

* * * * *